Patented Aug. 9, 1949

2,478,738

UNITED STATES PATENT OFFICE 2,478,738

POLYMERIZATION OF CHLOROPRENE IN THE PRESENCE OF TETRAALKYL-DIAMINO-DIPHENYL METHANE

Robert S. Barrows, Claymont, Del., assignor to E. I. du Pont de Nemours & Company, Wilmington, Del., a corporation of Delaware No Drawing. Application April 2, 1946, Serial No. 659,156

4 Claims. (Cl. 260—82.1)

This invention relates to a process for producing improved 1,3-diene polymers, and has for its object to provide a process for producing rubber-like polymers of 2-chloro-1,3-butadiene and copolymers of the same with 1,3-butadiene hydrocarbons, such as butadiene-1,3 and isoprene, which have improved stability with regard to aging and which, on vulcanization, have improved properties, more particularly tensile strength.

I have found that, where a mixture of 2-chloro-1,3-butadiene with a 1,3-butadiene hydrocarbon, more particularly 1,3-butadiene and isoprene, is polymerized in an acid emulsion system in the presence of a tetraalkyl-p,p'-diamino-diphenyl methane, a polymer is obtained which has improved stability with regard to aging, and which has better plasticity and working properties.

The tetraalkyl-p,p'-diamino-diphenyl methanes have the formula:

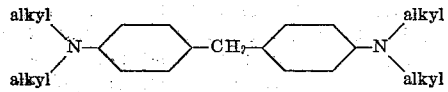

Where the tetraalkyl-p,p'-diamino-diphenyl methanes are employed in an emulsion system having a pH below 7, the rate of polymerization in some cases is retarded, although not to an undesirable degree, but, by incorporating these tetraalkyl-diamino-diphenyl methanes in the polymerization system, rubber-like polymers are obtained which exhibit improved stability, plasticity and working properties.

The invention is particularly applicable in the copolymerization of 2-chloro-1,3-butadiene with 1,3-butadiene hydrocarbons in which a mixture of from 40% to 90% of 2-chloro-1,3-butadiene and 60% to 10% of the butadiene hydrocarbon, such as 1,3-butadiene or isoprene, is polymerized in an emulsion system having a pH of from 3 to 5. The invention may also be applied to the polymerization of 2-chloro-1,3-butadiene alone, although it is of particular importance in the preparation of the copolymers.

The tetraalkyl-p,p'-diamino-diphenyl methanes may be used in an amount ranging from 0.1% to 2.0%, based on the weight of the polymerizable materials, although it will be found that about 1.0% is preferred. These tetraalkyl-diamino-diphenyl methanes may be employed together with mercaptans if desired, in which case the mercaptan will usually be employed in an amount of from 0.01% to 0.2%, based on the weight of the polymerizable materials. The use of 0.075% of pinene mercaptan together with the tetraalkyl-diamino-diphenyl methane has been found to give very desirable results where a mercaptan is employed. Other mercaptans, such as lorol mercaptan and the like, may be employed.

The tetraalkyl-p,p'-diamino-diphenyl methanes particularly suitable for use in the present invention are those in which the alkyl groups contain not more than 4 carbon atoms. The tetramethyl-, tetraethyl-, tetrapropyl- or tetrabutyl-p,p'-diamino-diphenyl methanes may be used in this invention, as more particularly illustrated by the following examples, in which the parts used are by weight, unless otherwise specified.

Example 1

A solution of 123 grams of a 65% solution of the sodium salt of sulfated oleyl acetate, 4 grams of potassium persulfate, 4 grams of Daxad-11 (the sodium salt of the condensation product of formaldehyde and naphthalene sulfonic acids), and 4 grams of acetic acid in 1100 grams of water was made (the pH of this solution was under 3.5). To this solution was added, with vigorous stirring, a solution of 8 grams of tetramethyl-p,p'-diamino-diphenyl methane, and 0.4 gram of pinene mercaptan in 600 grams of 2-chloro-1,3-butadiene and 200 grams of isoprene. When emulsification had been completed, the rate of agitation was reduced, the emulsion was warmed to 35° C. and was maintained at 35° C. for the duration of the polymerization. After 5 hours, the specific gravity of the emulsion had increased to 1.024. At this point, the latex was stabilized with 4.4 grams of phenyl-alpha-naphthylamine and 3.6 grams of diphenylamine (which had been melted together and dispersed in 8 cc. of water with the help of a small amount of sulfated oleyl acetate). The latex was coagulated with sodium chloride brine. The polymer was washed on a corrugated rubber mill and then milled to dryness on a smooth mill. 680 grams of a smooth milling polymer was obtained which had a Williams' plasticity number of 85 with a recovery of 7. A polymer made from the same monomer mixture, in the same manner but without the addition of the tetramethyl-p,p'-diamino-diphenyl methane, had a Williams' plasticity number of 132 with a recovery number of 108.

Example 2

A monomer mixture of 405 grams of 2-chloro-1,3-butadiene and 270 grams of 1,3-butadiene containing 8 grams of tetramethyl-p,p'-diamino diphenyl methane was employed in place of the monomer mixture of Example 1, and the polymerization was carried out in a small pressure vessel. In this polymerization, no mercaptan was employed.

After 6 hours' polymerization, stabilization and isolation as described in Example 1, 481 grams of a smooth milling polymer was obtained. The polymer had a Williams' plasticity number of 81 with a recovery number of 0, whereas a polymer made in the absence of the modifying agent had a plasticity number of 122 with a recovery number of 48.

*Example 3*

2-chloro-1,3-butadiene (30 grams), to which 0.6 gram of tetramethyl-p,p'-diamino-diphenyl methane had been added, was added to a solution of 1.6 grams of sulfated oleyl acetate, 0.2 gram of potassium persulfate, 0.2 gram of acetic acid in 58 grams of water, in a glass tube. The mixture was cooled to 0° C. and 10 grams of 1,3-butadiene was added. The tube was stoppered and enclosed in a metal guard. Polymerization was carried out while rotating the tube in a 40° C. water bath for 5 hours. The tube was opened, and excess butadiene allowed to blow off. The latex was stabilized with 0.22 gram of phenyl-alpha-naphthylamine and 0.18 gram of diphenylamine made up as a dispersion, as described in Example 1. The polymer was isolated as described in Example 1. After a few minutes' milling on a 30° C. mill, the polymer formed a smooth band and a good rolling bank. 34.2 grams of polymer was obtained. A polymer made in the same manner, but without the tetramethyl-p,p'-diamino-diphenyl methane, would not band on the smooth mill during 35 minutes of cold milling.

*Example 4*

The procedure of this example was the same as that of Example 3, except that 0.4 gram of tetramethyl-p,p'-diamino-diphenyl methane was employed with 0.02 gram of pinene mercaptan as modifier. 34 grams of polymer was obtained, which showed good milling characteristics after 6 minutes of cold milling. A polymer made in the absence of the tetramethyl-p,p'-diamino-diphenyl methane failed to give a coherent band on the mill after 20 minutes' milling. The use of 0.4 gram of dibenzylamine, dimethyl aniline, triphenylamine, or benzylmethyl aniline, in place of the tetramethyl-p,p'-diamino-diphenyl methane, failed to give a polymer which would plasticize during milling, as did the polymers modified with tetramethyl-p,p'-diamino-diphenylamine. Tributylamine inhibited polymerization. Therefore, it is apparent that tertiary amines as a class are not effective modifiers for the copolymerization of 2-chloro-1,3-butadiene and 1,3-butadiene.

This invention is useful in that 2-chloro-1,3-butadiene copolymers with hydrocarbon dienes with improved stability and improved plasticity and working properties may be obtained. The use of tetramethyl-p,p'-diamino-diphenyl methane as a modifier has the principal advantage over conventional modifiers such as mercaptans that a polymer is produced which responds more rapidly to plasticization by mechanical working, such as on a rubber mill.

I claim:

1. In the process of effecting emulsion polymerization of a monomer mixture consisting of from 40% to 90% of 2-chloro-1,3-butadiene and 60% to 10% of 1,3-butadiene hydrocarbon in which the polymerization is carried out under acid conditions, the step which comprises effecting the polymerization in the presence of from 0.1% to 2%, based on the weight of the polymerizable material, of a tetraalkyl-p,p'-diamino-diphenyl methane in which each of the alkyl groups contains from 1 to 4 carbon atoms.

2. In the process of effecting emulsion polymerization of a monomer mixture consisting of from 40% to 90% of 2-chloro-1,3-butadiene and 60% to 10% of 1,3-butadiene hydrocarbon in which the polymerization is carried out under acid conditions, the step which comprises effecting the polymerization in the presence of from 0.1% to 2%, based on the weight of the polymerizable material, of tetramethyl-p,p'-diamino-diphenyl methane.

3. In the process of effecting emulsion polymerization of a monomer mixture consisting of from 40% to 90% of 2-chloro-1,3-butadiene and 60% to 10% of isoprene in which the polymerization is carried out under acid conditions, the step which comprises effecting the polymerization in the presence of from 0.1% to 2%, based on the weight of the polymerizable material, of a tetraalkyl-p,p'-diamino-diphenyl methane in which each of the alkyl groups contains from 1 to 4 carbon atoms.

4. In the process of effecting emulsion polymerization of a monomer mixture consisting of from 40% to 90% of 2-chloro-1,3-butadiene and 60% to 10% of isoprene in which the polymerization is carried out under acid conditions, the step which comprises effecting the polymerization in the presence of from 0.1% to 2%, based on the weight of the polymerizable material, of tetramethyl-p,p'-diamino-diphenyl methane.

ROBERT S. BARROWS.

REFERENCES CITED

The following references are of record in the file of this patent:

UNITED STATES PATENTS

| Number | Name | Date |
|---|---|---|
| 1,954,377 | Calcott | Apr. 10, 1934 |
| 2,259,122 | Walker | Oct. 14, 1941 |

OTHER REFERENCES

"Duprene" Rubber Age, December 10, 1931, page 218.